US012540680B2

(12) United States Patent
Bai

(10) Patent No.: US 12,540,680 B2
(45) Date of Patent: Feb. 3, 2026

(54) FLUID CONTROL VALVE AND BALL HOLDER

(71) Applicant: Yi-Jhih Bai, Taichung (TW)

(72) Inventor: Yi-Jhih Bai, Taichung (TW)

( * ) Notice: Subject to any disclaimer, the term of this patent is extended or adjusted under 35 U.S.C. 154(b) by 0 days.

(21) Appl. No.: 18/669,556

(22) Filed: May 21, 2024

(65) Prior Publication Data

US 2025/0122942 A1 Apr. 17, 2025

(30) Foreign Application Priority Data

Oct. 11, 2023 (TW) ................................ 112138737

(51) Int. Cl.
*F16K 15/04* (2006.01)
*F16K 17/28* (2006.01)
*F16K 31/08* (2006.01)

(52) U.S. Cl.
CPC ............ *F16K 15/048* (2013.01); *F16K 15/04* (2013.01); *F16K 17/285* (2013.01); *F16K 31/084* (2013.01)

(58) Field of Classification Search
CPC ...... F16K 15/021; F16K 15/023; F16K 15/04; F16K 15/048; F16K 15/06; F16K 17/02; F16K 17/285; F16K 31/084
See application file for complete search history.

(56) References Cited

U.S. PATENT DOCUMENTS 2,569,316 A * 9/1951 Jerman ................... F16K 15/04 251/65
3,921,662 A * 11/1975 Hauffe .................... F16K 17/34 137/515
4,210,174 A * 7/1980 Eross ...................... F16K 17/02 137/559
4,465,095 A * 8/1984 Lindberg ................ F16K 17/02 137/516.25
5,280,806 A * 1/1994 Glazebrook ............ F16K 17/34 251/65
2010/0139787 A1* 6/2010 Li ......................... F16K 31/084 137/519.5

* cited by examiner

*Primary Examiner* — Kevin F Murphy

(57) ABSTRACT

A fluid control valve includes a valve body having first and second air passages. A first valve air passage is defined between the first air passage and the second air passage. An annular blocking portion is located between the second air passage and the first valve air passage. A second valve air passage is defined through the annular blocking portion and communicates with the first valve air passage. A magnetic ball is movably located in the first valve air passage. A ball holder has a mounting portion and a connecting portion which has an air passage and is connected to an inner wall of the first air passage. The magnetic ball is positioned between the annular blocking portion and the mounting portion which has a magnetic piece. When the fluid control is not in use, the magnetic ball is attracted to the mounting end by the magnet piece.

5 Claims, 12 Drawing Sheets

FLUID CONTROL VALVE AND BALL HOLDER

FIELD OF THE INVENTION

The present invention relates to a fluid control, such as controlling the flow of fluids in gas pipelines and liquefied gas pipelines, which includes fluid control such as backflow prevention, flow interruption, and flow restriction.

BACKGROUND OF THE INVENTION

The conventional products, whether they are flow interrupters or backflow preventers, commonly use a spherical body internally for fluid control based on design purposes. However, existing products using spherical bodies for fluid control have limitations in installation angles. When not executing fluid flow interruption control, the spherical body is prone to easy movement within the product, leading to instability in fluid flow through the valve body.

The present invention intends to provide a fluid control valve and its ball holder to eliminate the shortcomings mentioned above.

SUMMARY OF THE INVENTION

The present invention relates to a fluid control valve and comprises a valve body and a magnetic ball. The valve body comprises a first air passage and a second air passage, and a first valve air passage defined between the first air passage and the second air passage. The valve body has an annular blocking portion formed to an inner wall thereof and located between the second air passage and the first valve air passage. A second valve air passage is defined through the annular blocking portion and communicates with the first valve air passage. The magnetic ball is movably located in the first valve air passage. A ball holder has a mounting portion and a connecting portion, wherein the connecting portion has at least one air passage, and the mounting portion is provided with a magnet piece. The connecting portion is connected to the inner wall of the first air passage. The magnetic ball is positioned between the annular blocking portion and the mounting portion.

Alternatively, the present invention also provides a ball holder for a fluid control valve and is used to position a magnetic ball inside the valve body. The ball holder has a mounting portion and a connecting portion, wherein the connecting portion has at least one air passage, and the mounting portion is provided with a magnet piece.

The primary object of the present invention is that the mounting portion of the ball holder of the present invention includes a magnet piece. Therefore, when the ball holder is installed in the valve body with the magnet piece facing the magnetic ball, the magnetic ball is attracted to the mounting portion due to the magnetic force of the magnet piece. When the fluid passes through the magnetic ball, if the thrust generated by the fluid is greater than the attraction force between the magnet piece and the magnetic ball, the magnetic ball will detach from the mounting portion and execute the interruption of fluid flow or backflow. When an abnormal condition causing the magnetic ball to detach from the mounting portion disappears, the magnetic ball will return to the state of being attracted to the mounting portion due to the magnetic force of the magnet piece. Therefore, when the ball holder is installed in the valve body, the magnetic ball does not move arbitrarily when not performing fluid interruption control due to the magnetic attraction of the magnet piece to the mounting portion.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
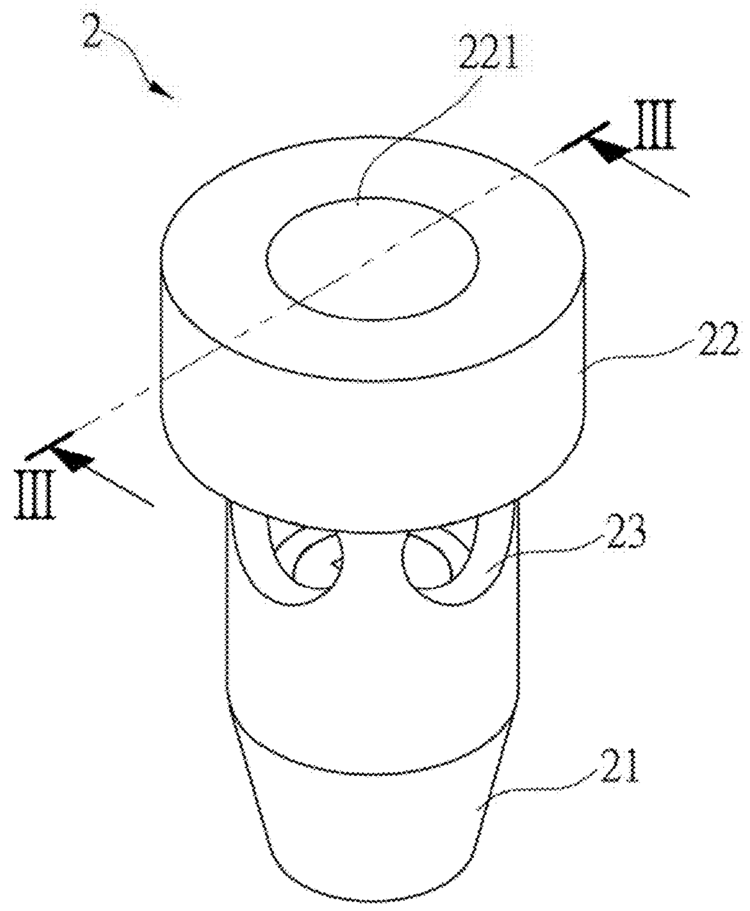
FIG. 1 is a perspective view of the ball holder of the present invention.
Figure 2:
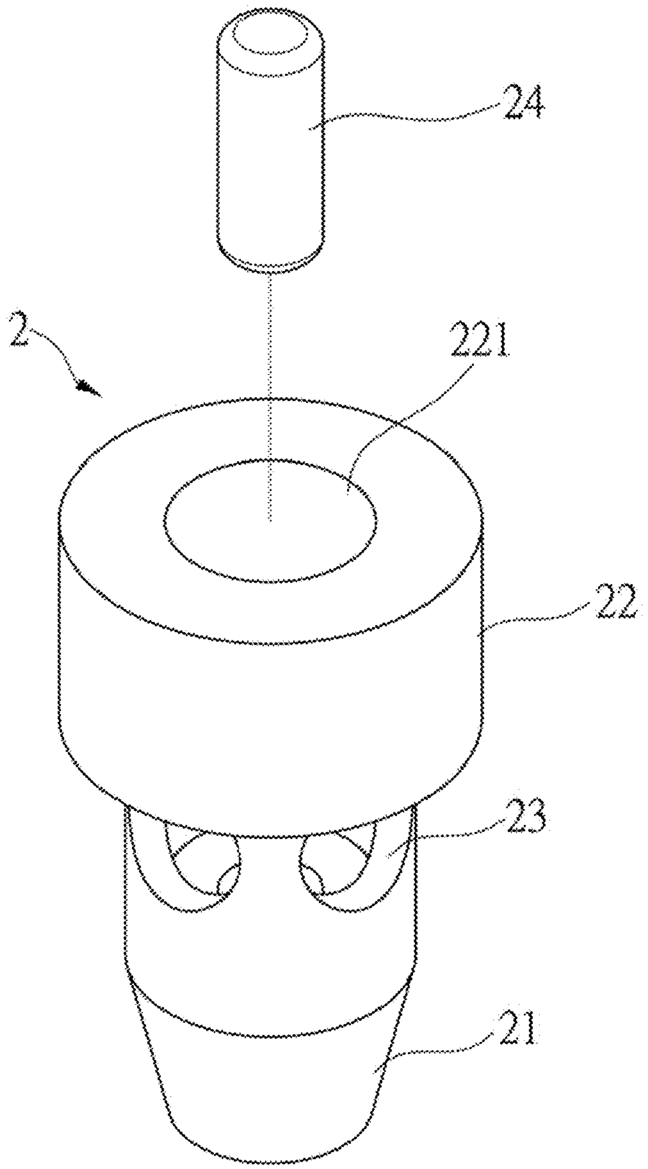
FIG. 2 is an exploded view of the ball holder of the present invention.
Figure 3:
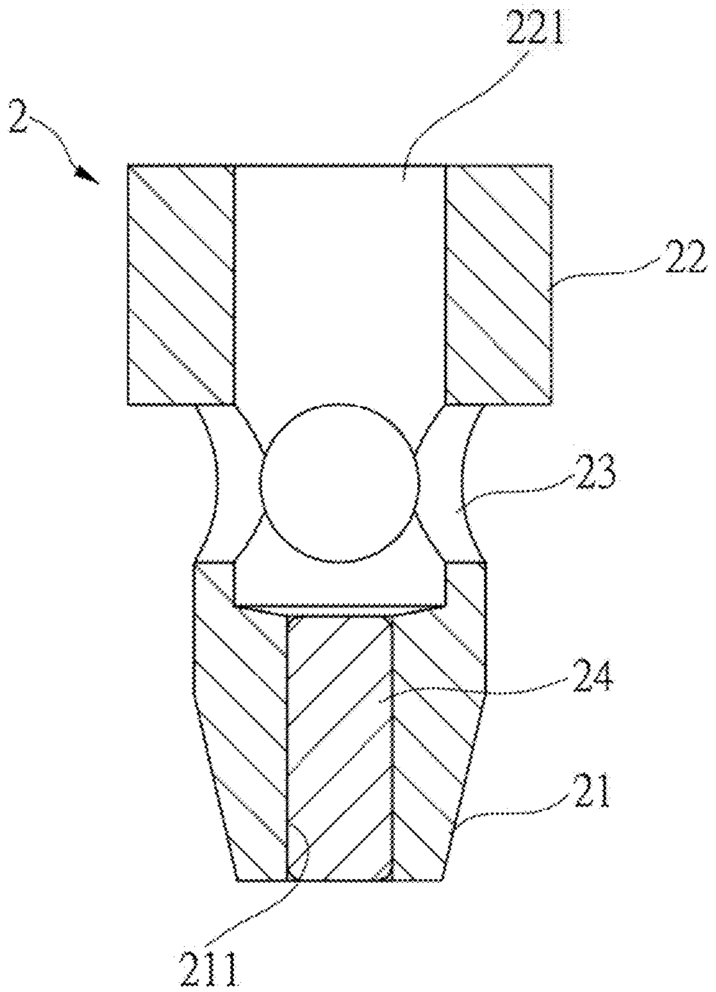
FIG. 3 is cross sectional view, taken along line III-III of FIG. 1.

Referring to FIGS. 1 to 3, the ball holder (2) of the present invention comprises a mounting portion (21) and a connecting portion (22) at two opposite ends. The connecting portion (22) has an air passage (221), and the ball holder (2) has a side through-hole (23) between the mounting portion (21) and the connecting portion (22). The side through-hole (23) communicates with the air passage (221). The mounting portion (21) is equipped with a magnet piece (24).

Figure 4:
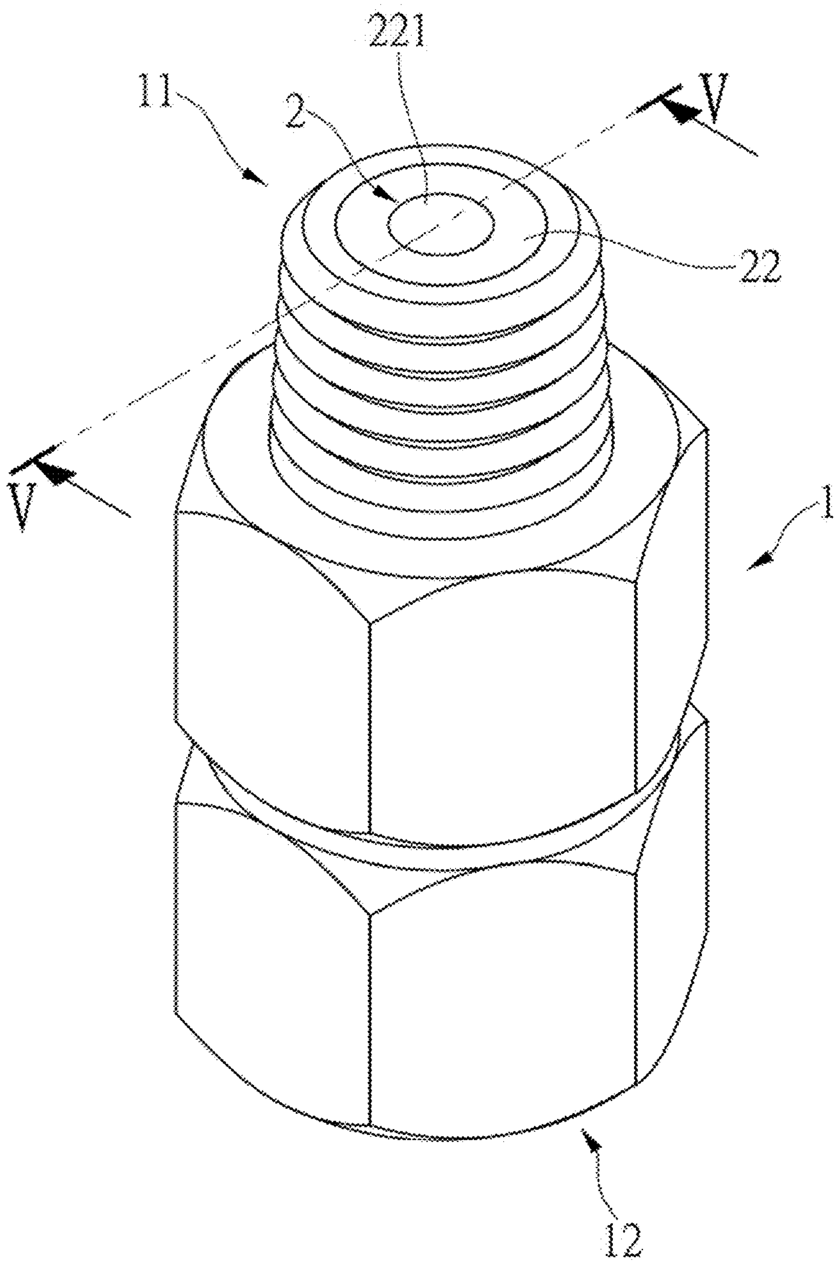
FIG. 4 is an embodiment of the valve body of the present invention.
Figure 5:
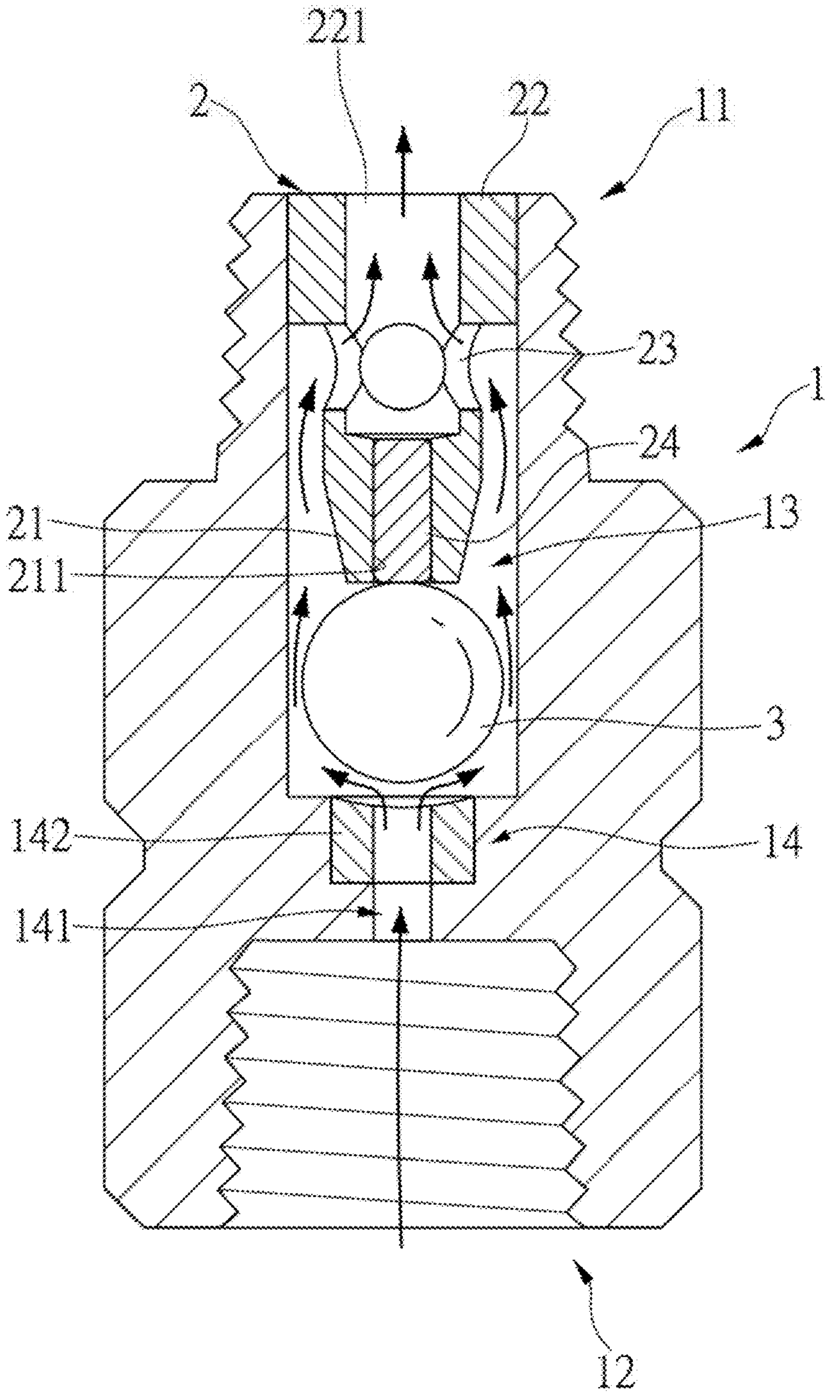
FIG. 5 is a cross sectional view, taken along line V-V of FIG. 4.

As shown in FIGS. 4 and 5, the fluid control valve of the present invention comprising a valve body (1) which comprises a first air passage (11) and a second air passage (12). A first valve air passage (13) is defined between the first air passage (11) and the second air passage (12). The valve body (1) includes an annular blocking portion (14) formed to an inner wall thereof and located between the second air passage (12) and the first valve air passage (13). A second valve air passage (141) is defined through the annular blocking portion (14) and communicates with the first valve air passage (13). The connecting portion (22) is connected to an inner wall of the first air passage (11). The mounting portion (21) faces the annular blocking portion (14). The magnetic ball (3) is movably located in the first valve air passage (13), and located between the mounting portion (21) and the annular blocking portion (14).

The magnetic ball (3) can be made of materials such as iron, cobalt, nickel, and other magnetic substances. Magnetic substances may not necessarily possess magnetism, but when they are close to a magnet, they become magnetized and exhibit magnetic properties. Therefore, the magnet piece (24) can attract the magnetic ball (3) with magnetic force. The annular blocking portion (14) can be of a type that includes a seal ring (142).

As shown in FIG. 5, the mounting portion (21) of the ball holder (2) includes a magnet piece (24). When the ball holder (2) is installed in the valve body (1) with the magnet piece (24) facing the magnetic ball (3), the magnetic ball (3) can be attracted to the mounting portion (21) due to the magnetic force of the magnet piece (24). When fluid flows through the magnetic ball (3), if the thrust generated by the fluid is greater than the attraction force between the magnet piece (24) and the magnetic ball (3), the magnetic ball (3) will detach from the mounting portion (21) and perform the interruption of fluid flow or backflow. When an abnormal condition causing the magnetic ball (3) to detach from the mounting portion (21) disappears, the magnetic ball (3) will return to the state of being attracted to the mounting portion (21) due to the magnetic force of the magnet piece (24). Therefore, it can be understood that when the ball holder (2) is installed in the valve body (1), the magnetic ball (3) does not move arbitrarily when not performing fluid interruption control due to the magnetic attraction of the magnet piece (24) to the mounting portion (21).

Figure 6:
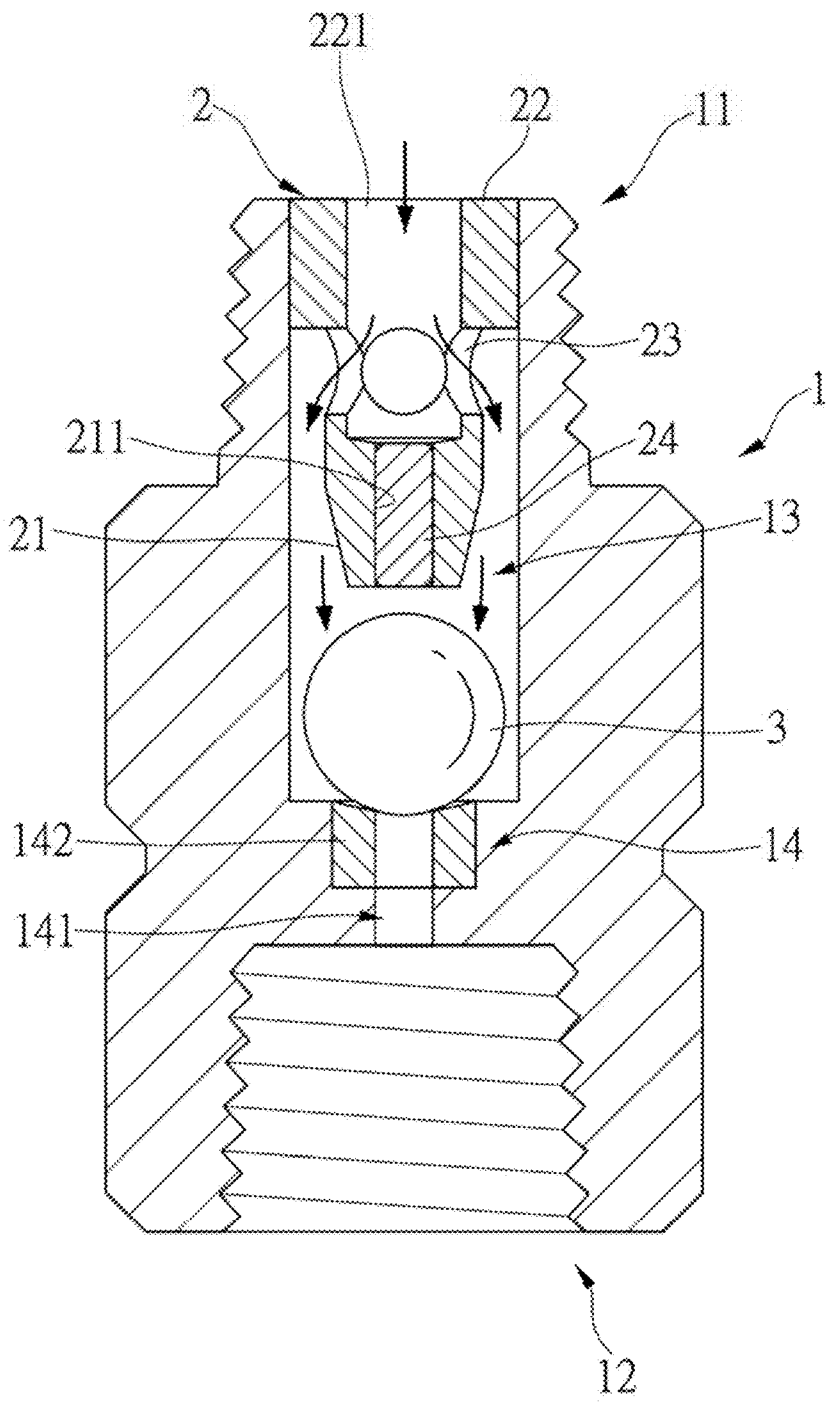
FIG. 6 illustrates that the magnetic ball detaches from the mounting portion under fluid thrust.

The type of fluid control performed by the valve body (1) mainly depends on the normal flow direction of the fluid entering and exiting. For example, as shown in the fifth diagram, if the fluid flows in the conventional direction indicated by the arrows, where the first air passage (11) is the fluid outlet and the second air passage (12) is the fluid inlet, the fluid control of the valve body (1) belongs to the backflow prevention valve type. Therefore, when the fluid flows in the reverse direction as shown in FIG. 6, and the thrust generated by the fluid is greater than the attraction force between the magnet piece (24) and the magnetic ball (3), the magnetic ball (3) will detach from the mounting portion (21) and block the communication between the first valve air passage (13) and the second valve air passage (141).

If the valve body (1) is used in the collection pipeline of liquefied gas, when the liquefied mechanism is closed, the thrust generated by the fluid flowing back in the collection pipeline may not be sufficient to detach the magnetic ball (3) from the mounting portion (21). Therefore, some of the fluid in the collection pipeline can smoothly flow back to avoid accumulation in the collection pipeline, thereby reducing the risk of pipeline rupture.

Figure 7:
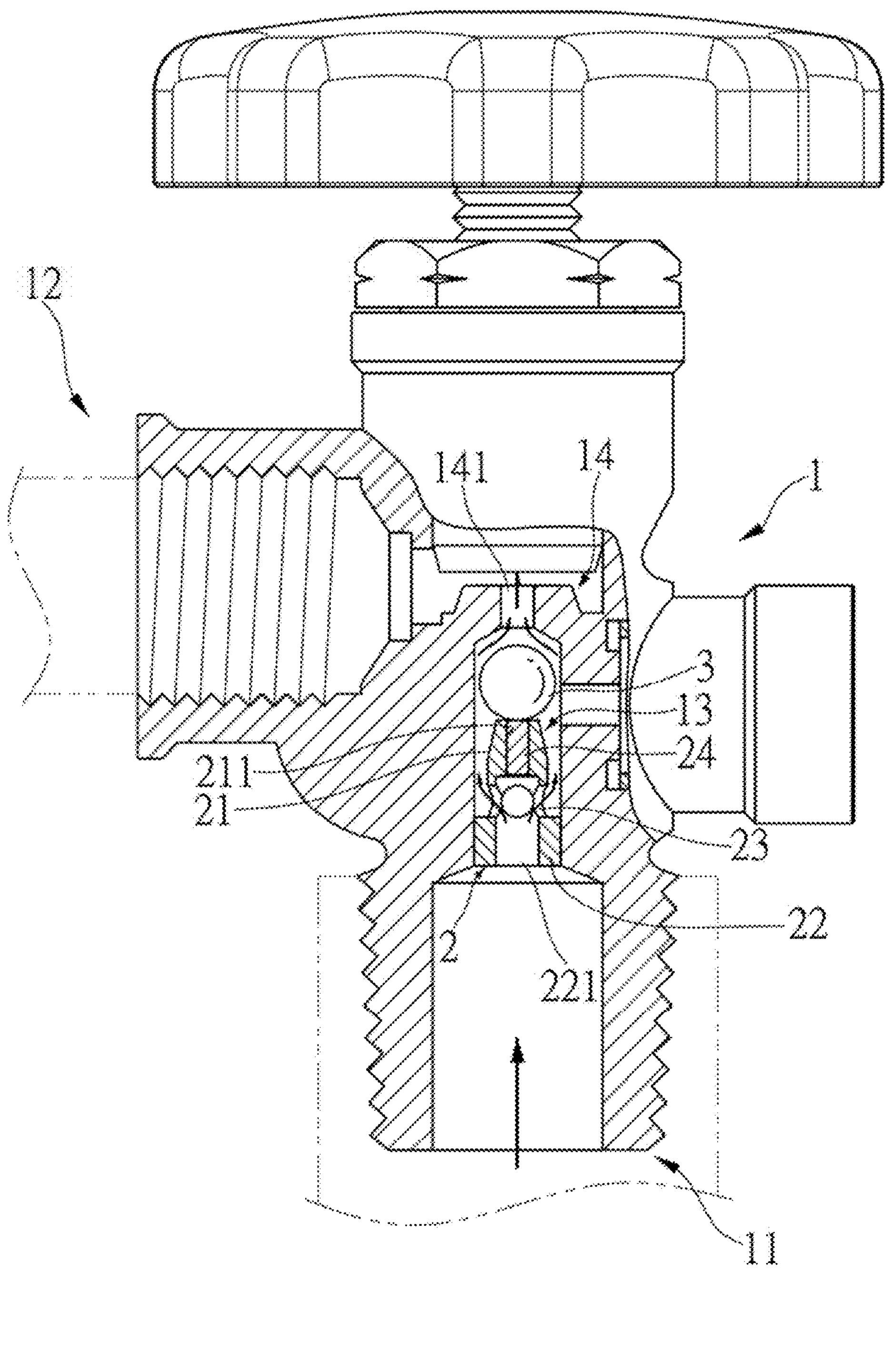
FIG. 7 is another embodiment of the valve body of the present invention.
Figure 8:
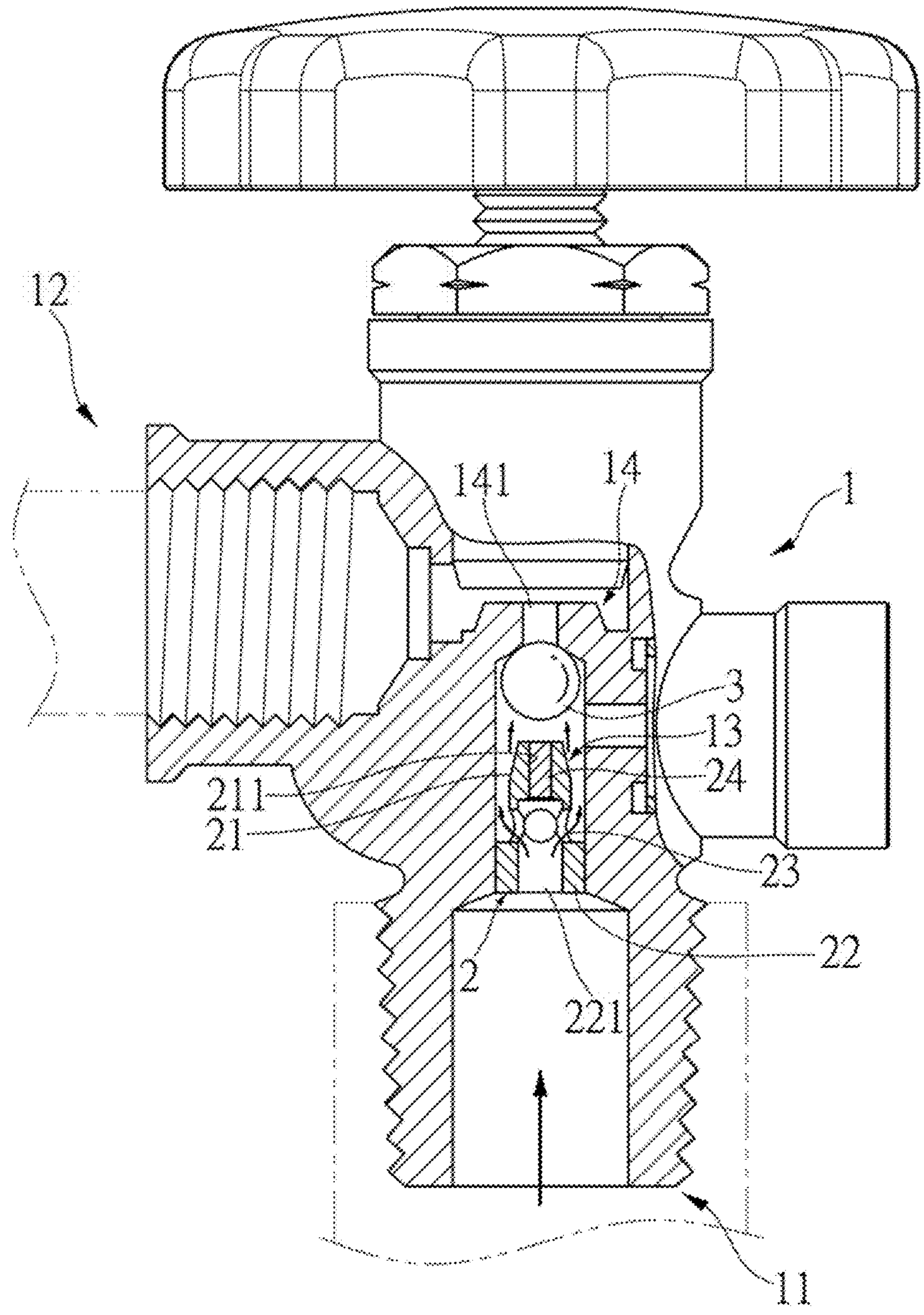
FIG. 8 is yet another embodiment of the valve body of the present invention, and a schematic diagram of the magnetic ball detaching from the mounting portion under fluid thrust.

If the valve body (1) is used in the conventional flow direction of the fluid as shown in FIG. 7, where the first air passage (11) is the fluid inlet and the second air passage (12) is the fluid outlet, and the fluid flows conventionally, the thrust may not be sufficient to detach the magnetic ball (3) from the mounting portion (21). In this case, the fluid control of the valve body (1) belongs to the overflow valve type. In the event of an accident, such as a rupture in the rear pipeline, the thrust of the fluid inside the pipeline will instantly increase, as shown in FIG. 8, and the fluid thrust may be sufficient to detach the magnetic ball (3) from the mounting portion (21) to block the communication between the first valve air passage (13) and the second valve air passage (141) to prevent further leakage in case of accidents.

Accordingly, the ball holder (2) of the present invention can ensure that the magnetic ball (3) is attracted to the mounting portion (21) due to the magnetic force of the magnet piece (24) when not performing fluid interruption control, regardless of the type of fluid control performed by the valve body (1). With this technology of magnetically fixing the position of the magnetic ball (3), the valve body (1) will not experience movement of the magnetic ball (3) when not performing fluid interruption control, regardless of the angle at which it is installed in the target position, thus effectively improving the problems of traditional products.

Figure 9:
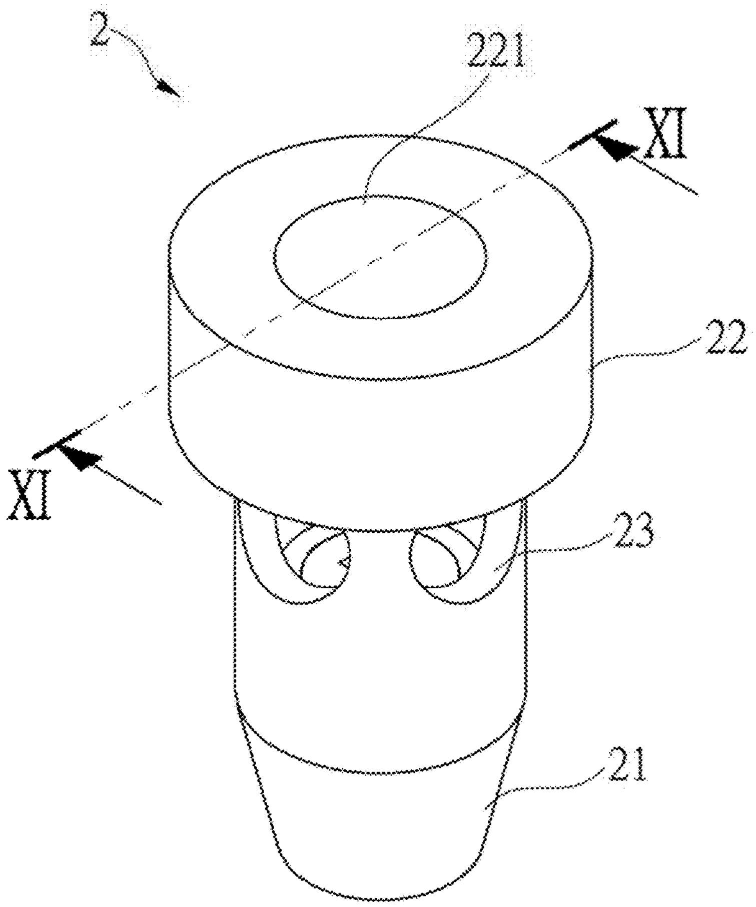
FIG. 9 is a perspective view of another embodiment of the ball holder.
Figure 10:
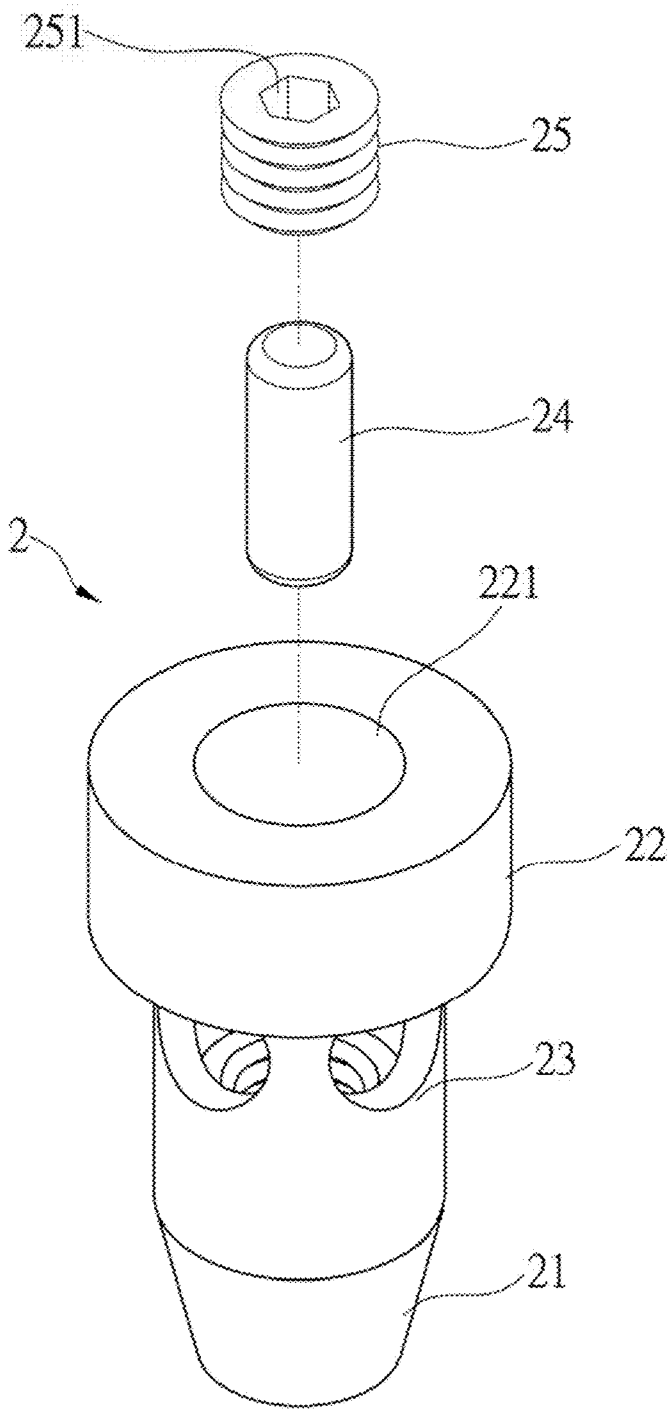
FIG. 10 is an exploded view of another embodiment of the ball holder.
Figure 11:
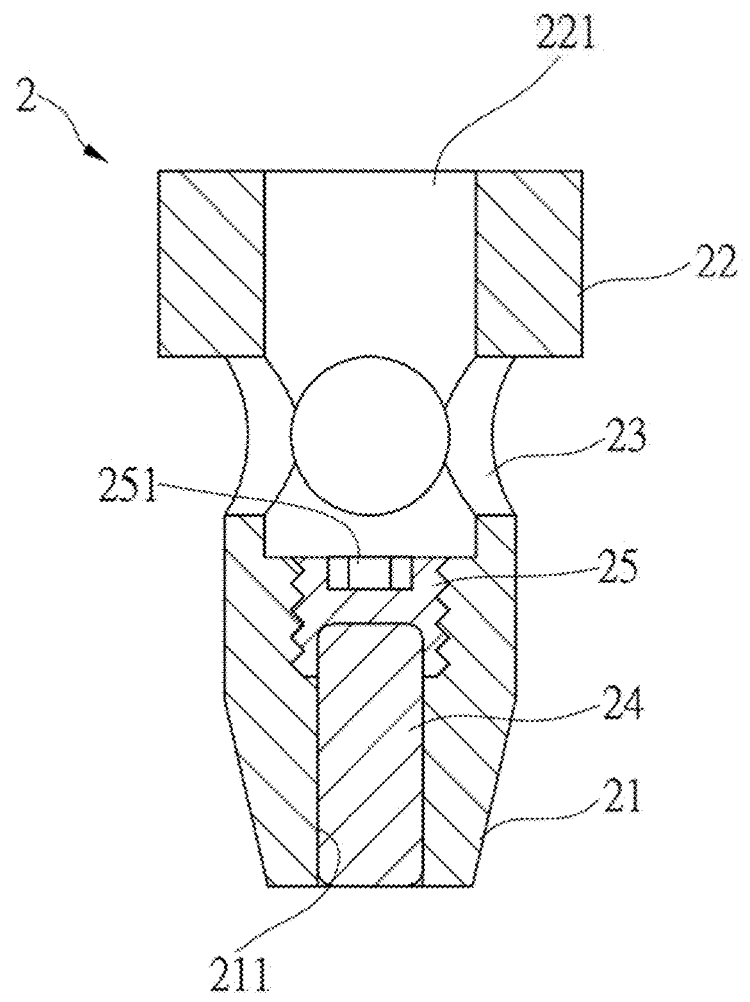
FIG. 11 is a cross sectional view, taken along line XI-XI of FIG. 9.
Figure 12:
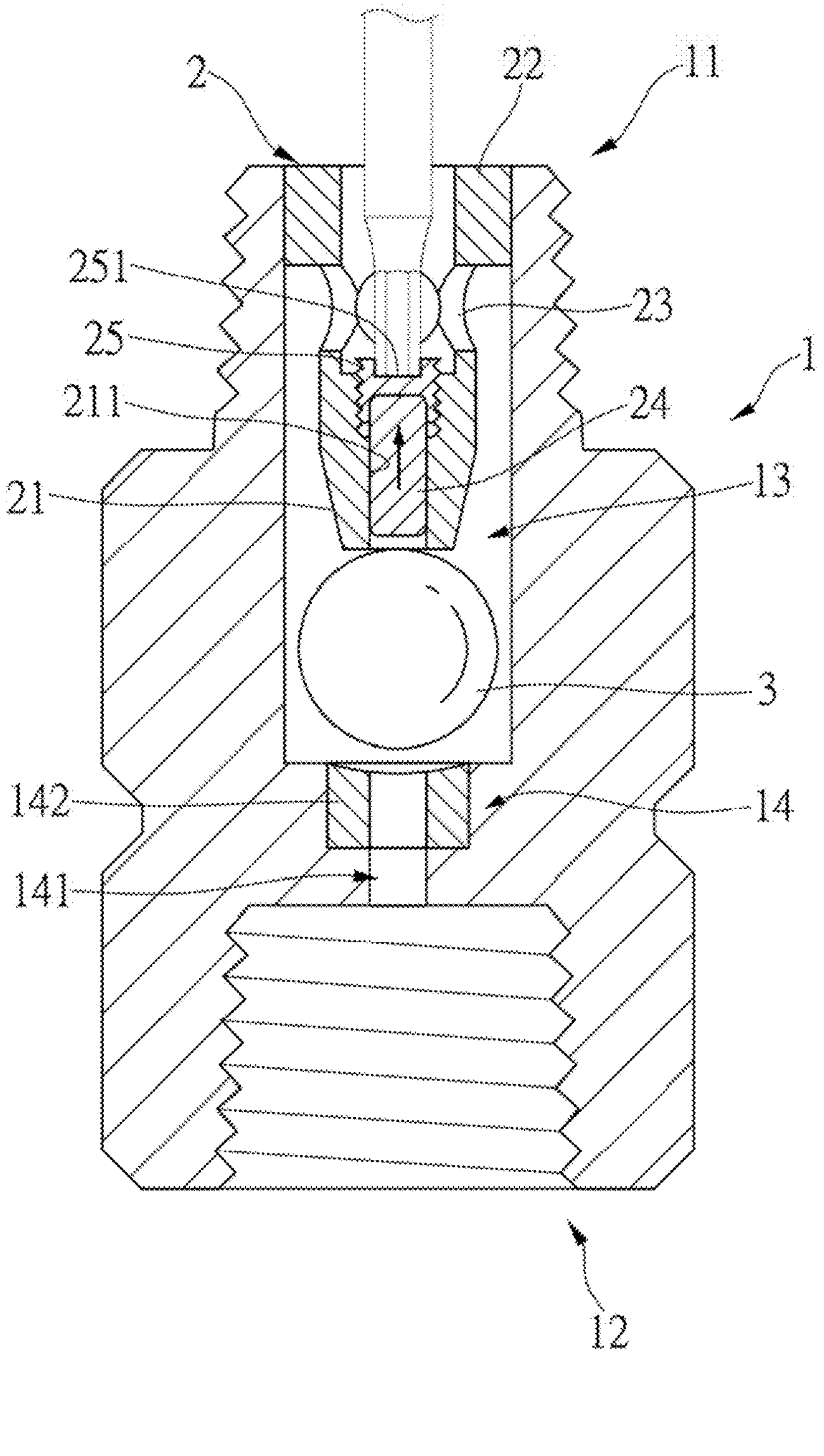
FIG. 12 illustrates the adjusting positions of the magnet piece.

Furthermore, as shown in FIGS. 9 to 11, the mounting portion (21) of the ball holder (2) has a mounting elongated hole (211), with the inner wall of the mounting elongated hole (211) threaded. One end of the magnet piece (24) is equipped with a screw (25) that matches the thread on the inner wall of the mounting elongated hole (211). The screw (25) has an operating groove (251) on one side facing the connecting portion (22). The shape of the operating groove (251) can be hexagonal, linear, cross-shaped, etc. In this embodiment, the operating groove (251) is illustrated as hexagonal. This structure allows the user, as shown in FIG. 12, to adjust the position of the magnet piece (24) in the mounting elongated hole (211) by inserting a tool into the operating groove (251) manually. This adjustment changes the distance between the magnetic ball (3) and the magnet piece (24) when the magnetic ball (3) is attracted to the mounting portion (21), thereby adjusting the force required to push the magnetic ball (3) away from the mounting portion (21).

While we have shown and described the embodiment in accordance with the present invention, it should be clear to those skilled in the art that further embodiments may be made without departing from the scope of the present invention.

What is claimed is:

1. A fluid control valve comprising a valve body (1) and a magnetic ball (3), the valve body (1) comprising a first air passage (11) and a second air passage (12), a first valve air passage (13) defined between the first air passage (11) and the second air passage (12), the valve body (1) having an annular blocking portion (14) formed to an inner wall thereof and located between the second air passage (12) and the first valve air passage (13), a second valve air passage (141) defined through the annular blocking portion (14) and communicating with the first valve air passage (13), the magnetic ball (3) movably located in the first valve air passage (13), a ball holder (2) having a mounting portion (21) and a connecting portion (22), wherein the connecting portion (22) has at least one air passage (221), the mounting portion (21) is provided with a magnet piece (24), and the connecting portion (22) is connected to an inner wall of the first air passage (11), the magnetic ball (3) is positioned between the annular blocking portion (14) and the mounting portion (21);

the ball holder (2) having a side through-hole (23) between the mounting portion (21) and the connecting portion (22), the side through-hole (23) respectively communicating with the first valve air passage (13) and the at least one air passage (221), the mounting portion (21) facing the annular blocking portion (14), and wherein when the magnetic ball (3) blocks communication between the first valve air passage (13) and the second valve air passage (141), the side through-hole (23) does not communicate with the second valve air passage (141), and the first air passage (11) and the second air passage (12) do not communicate.

2. The fluid control valve as claimed in claim 1, wherein the mounting portion (21) of the ball holder (2) has a mounting elongated hole (211) with a threaded inner wall, one end of the magnet piece (24) is provided with a screw piece (25) matching the threaded inner wall of the mounting elongated hole (211).

3. The fluid control valve as claimed in claim 2, wherein the screw piece (25) has an operating groove (251) defined in one end thereof and facing the connecting portion (22).

4. The fluid control valve as claimed in claim 1, wherein the magnet piece (24) is positioned at the center of the mounting portion (21).

5. The fluid control valve as claimed in claim 1, wherein the connecting portion (22) comprises multiple ribs, the air passage (221) is formed between adjacent ribs.

* * * * *